United States Patent [19]

Cerauskis

[11] Patent Number: 5,664,121
[45] Date of Patent: Sep. 2, 1997

[54] DUAL MODE ARBITRATION APPARATUS AND METHOD FOR REDUCING LATENCY BY ALLOWING THE POSSIBILITY OF SIMULTANEOUS REQUEST AND ACCESS FOR A SHARED BUS

[75] Inventor: Frederick M. Cerauskis, Mountain View, Calif.

[73] Assignee: Sun Microsystems, Inc., Mountain View, Calif.

[21] Appl. No.: 551,862

[22] Filed: Nov. 7, 1995

[51] Int. Cl.⁶ ............................................. G06F 13/00
[52] U.S. Cl. ................................... 395/293; 395/298
[58] Field of Search ............................. 395/293, 298, 395/878, 880, 872, 750

[56] References Cited

U.S. PATENT DOCUMENTS 4,449,183  5/1984  Flahive et al. ........................ 395/478
5,371,331  12/1994 Drerup et al. ........................ 395/293
5,418,967  5/1995  Simcoe et al. ....................... 395/729
5,541,916  7/1996  Nobuyuki et al. ................... 370/60.1

*Primary Examiner*—Jack B. Harvey
*Assistant Examiner*—Ario Etienne
*Attorney, Agent, or Firm*—Blakely Sokoloff Taylor & Zafman

[57] ABSTRACT

A method and apparatus for reducing arbitration latency. A fast mode is defined to allow simultaneous request and access to a shared resource. A slow mode is defined to require a request, followed by arbitration, followed by access to the resource. By dynamically switching between fast and slow modes responsive to the volume of requests received, arbitration latency is reduced.

15 Claims, 4 Drawing Sheets

Dual Mode Arbitration Unit
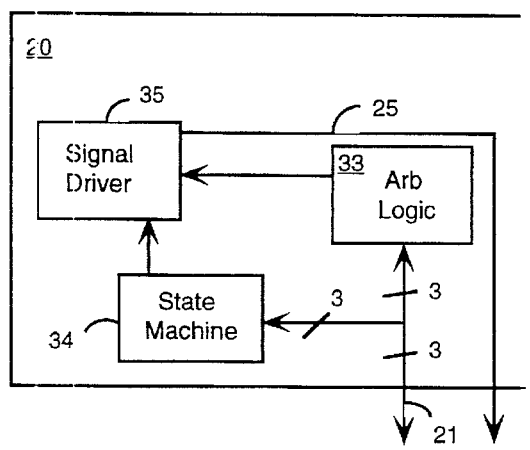
Figure 3
State Diagram
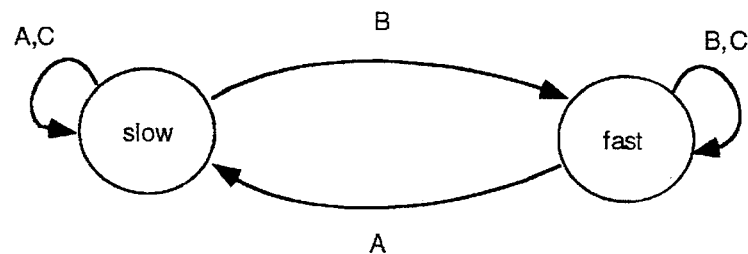
Figure 4A
| R | 0 | 1 |
|---|---|---|
| A | F | F |
| B | T | F |
| C | F | T |
Figure 4B

DUAL MODE ARBITRATION APPARATUS AND METHOD FOR REDUCING LATENCY BY ALLOWING THE POSSIBILITY OF SIMULTANEOUS REQUEST AND ACCESS FOR A SHARED BUS

BACKGROUND OF THE INVENTION

(1) Field of the Invention

The invention relates to arbitration of access to a bus. More specifically, the invention relates to reducing latency in arbitrating bus access.

(2) Related Art

Today's computer systems frequently have multiple devices sharing a bus. Among the possible devices are processors, I/O units, and DMA units. Since only one device can drive the bus at any time, it is necessary to arbitrate between devices requesting the bus to prevent multiple drivers from driving the bus simultaneously and creating invalid transmission packets. Arbitration has typically been performed by arbitration logic which follow the timing scheme shown in FIG. 1. In the first cycle, such prior art arbitration units accept the request along an arbitration bus and in the next cycle, the unit arbitrates between the request received in the previous cycle and grants bus access to the winner. This results in two cycles of latency between an initial request and the winner of the arbitration being granted access to the bus, even if only one device is making a request for bus access.

In view of the fact that the time required for a processor to gain access to the bus becomes a crucial performance bottleneck of currently existing systems, it is desirable, to the extent possible, to eliminate this arbitration latency as it exists in the prior art.

BRIEF SUMMARY OF THE INVENTION

An apparatus and method of dual mode arbitration is disclosed. In one mode, referred to as fast mode arbitration, devices sharing a bus are allowed to simultaneously request access to and drive the bus. This results in no latency if only a single device attempts to drive the bus. If multiple devices drive the bus, the system switches to slow mode arbitration. In slow mode arbitration, a winner is determined, and the packet resulting from multiple drivers is invalidated. The winner then drives the bus in the following cycle. Thus, in slow mode arbitration, the arbitration is no slower than the prior art and in fast mode arbitration, significant arbitration latency reduction can be achieved.

An added feature in slow mode arbitration further improves the latency reduction. By allowing a winning device to simultaneously request and drive the bus in subsequent cycles, latency will be reduced provided the device continues to win the arbitration. However, there is no penalty over the arbitration systems of the prior art if the previous winner loses. Such merely requires the driven packet be invalidated, and the new winner drives the bus in the cycle following arbitration.

BRIEF DESCRIPTION OF THE DRAWINGS

FIG. 3 is a block diagram of the dual mode arbitration unit of FIG. 2.

FIG. 4A is a state diagram corresponding to the state machine of the dual mode arbitration unit of FIG. 3.

FIG. 4B is a truth table corresponding to the state diagram of FIG. 4A.

DETAILED DESCRIPTION OF THE INVENTION

A method and apparatus for reducing arbitration latency is described. In the following description, numerous details are set forth in order to provide a thorough understanding of the present invention. It will be apparent, however, to one skilled in the art that the present invention may be practiced without such specific details. In other instances, well known operations and components have been shown in block diagram form in order to avoid obscuring the present invention.

Figure 2:
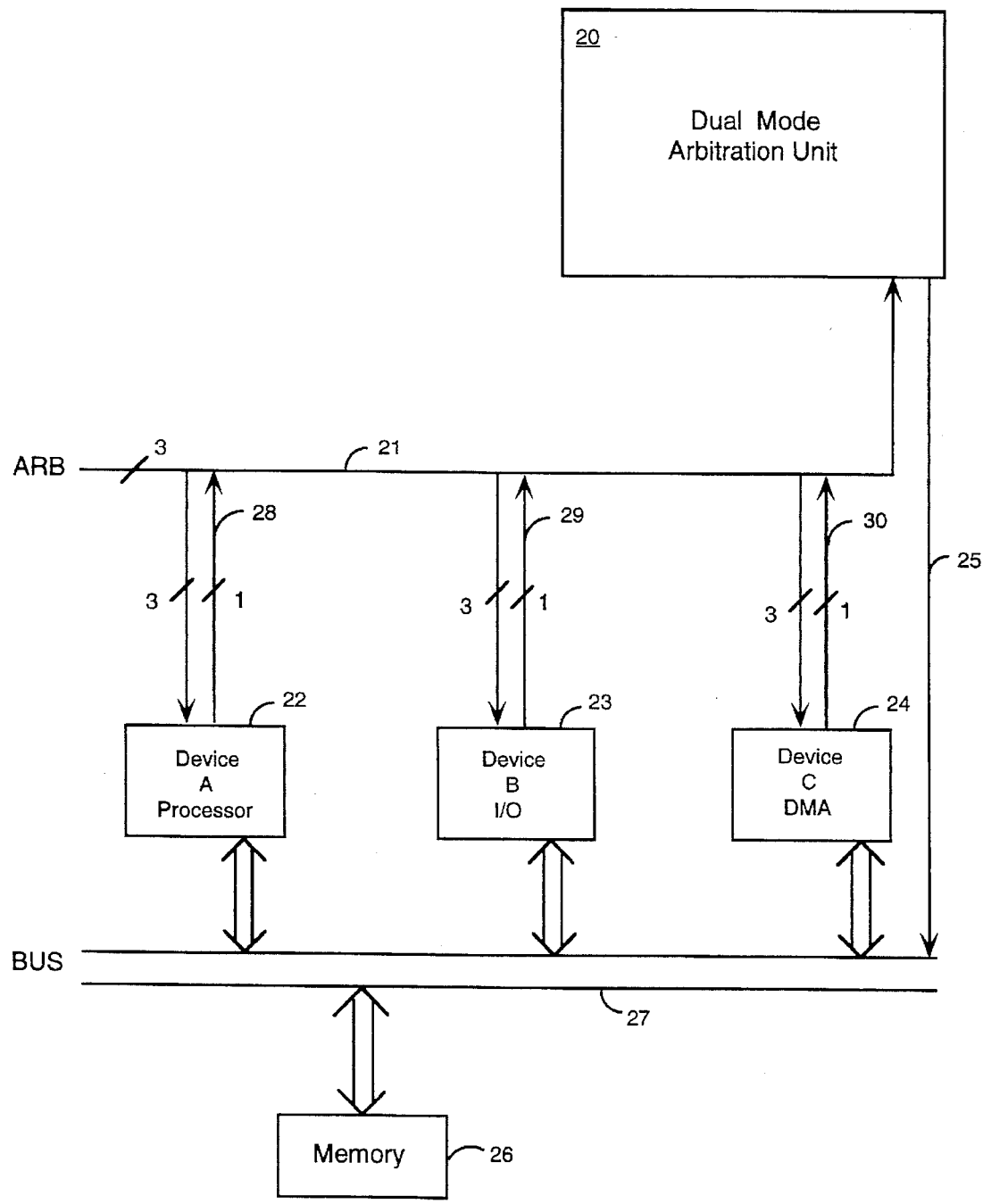
FIG. 2 is a block diagram of a system employing an embodiment of the invention.

FIG. 2 shows a system incorporating the dual mode arbitration unit of the instant invention. In this exemplary system, three potential device drivers, a processor 22, an I/O unit 23, and a DMA 24, are coupled to a shared bus 27. A memory unit 26 is also coupled to the shared bus 27. It will be recognized by one of ordinary skill in the art that N devices could be shared on the bus 27 where N is dictated by the electrical specifications of the shared bus 27 employed. These devices 22, 24 are also coupled to an arbitration bus 21. The arbitration bus 21 has the same number of lines as there are devices 22–24 coupled to it. Each device supplies one line 28–30 of the arbitration bus 21. All lines of the arbitration bus go to each device 22–24. The arbitration bus 21 supplies requests for access to the shared bus 27 to the dual mode arbitration unit 20 which arbitrates access to the shared bus in an effort to insure only a single device 22–24 drives the shared bus at any time.

FIG. 3 shows a block diagram of the dual mode arbitration unit 20 of the instant invention. The arbitration unit 20 includes arbitration logic 33 which is substantially the same as logic used in the prior art to arbitrate between device requests, a state machine 34, the state of which dictates the mode in which the arbitration unit 20 operates, and a signal driver 35 is provided to indicate the validity of a packet driven on the shared bus 27.

The arbitration logic 33 is coupled to the arbitration bus 21 and receives requests from each of the devices capable of driving the shared bus 27. These same requests are provided as inputs to the state machine 34. The signal driver 35 is connected to the arbitration logic 33 and the state machine 34. Based on the mode of operation and the winner of arbitration within the arbitration logic, the signal driver asserts the validity of a packet driven on the bus.

Figure 1:
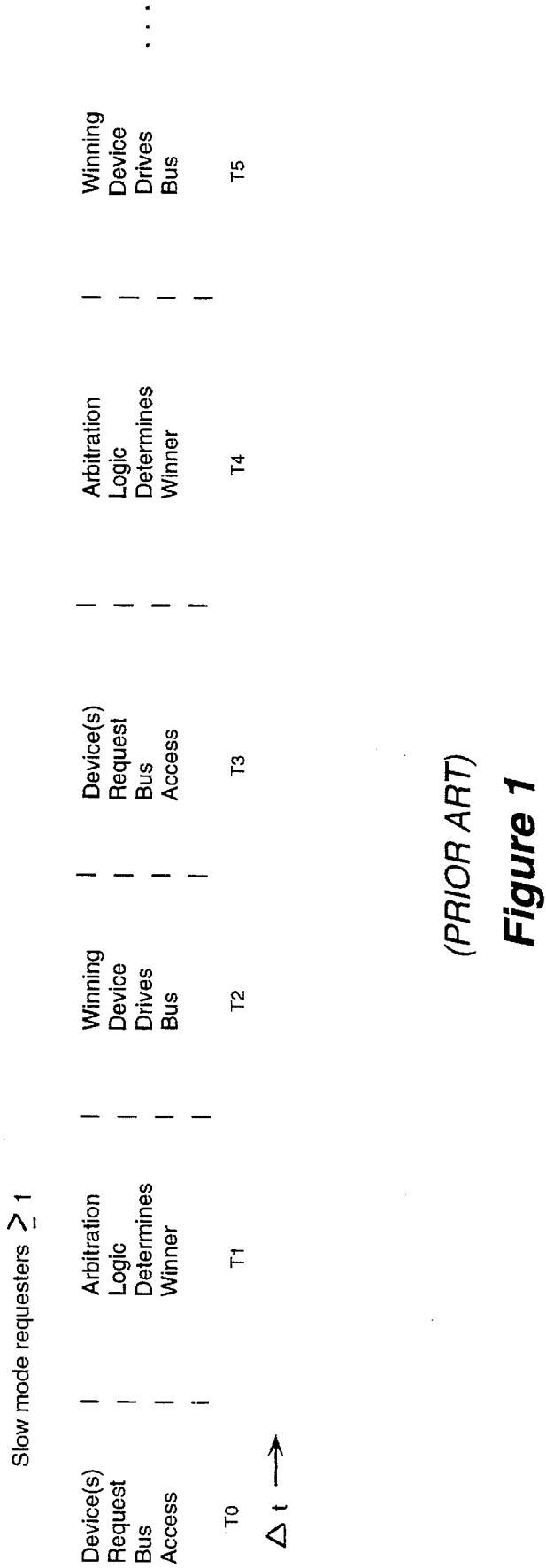
FIG. 1 is a timing table of a prior art arbitration sequence.

General use of arbitration logic and arbitration protocols are well known in the art, and no further discussion of the arbitration logic 33 will be made at this time. The dual mode arbitration unit 20 is envisioned to provide two modes of arbitration whereby arbitration latency is reduced. In one mode, all devices are permitted to simultaneously request access and drive a packet on the shared bus 27. In a second mode, either no device or only the device winning arbitration in the previous cycle is allowed to simultaneously request the shared bus and drive the packet on the shared bus. In the second mode, if no device is permitted to simultaneously request and drive the shared bus, the arbitration unit behaves as those in the prior art arbitration of FIG. 1. Alternatively, one device, the winner of the previous arbitration, may be allowed to simultaneously request access and drive the bus. The driven packet is declared valid in the event that the same device wins the arbitration in consecutive cycles. If the driving device loses the arbitration, the signal driver asserts that the driven packet is invalid, the invalid packet is discarded, and the winner of the arbitration drives the bus in the next cycle.

FIGS. 4A and B are a state diagram for state machine 34 and a truth table corresponding to the state diagram, respectively, for the instant invention, where R is the number of requests for access to the bus. In the first mode (fast state), if more than one device requests the bus, the state machine changes states, and the mode switches to the second mode (slow state). Moreover, the signal driver necessarily invalidates the driven packet since in the first mode, multiple requests imply multiple drivers driving the bus. Once the state machine enters the slow state, the second arbitration mode is employed. The state machine remains in the slow state until the number of requests in a cycle drop to zero. Once no requests are received in a cycle, the state machine switches to fast, and arbitration follows the first mode protocol.

Figure 5:
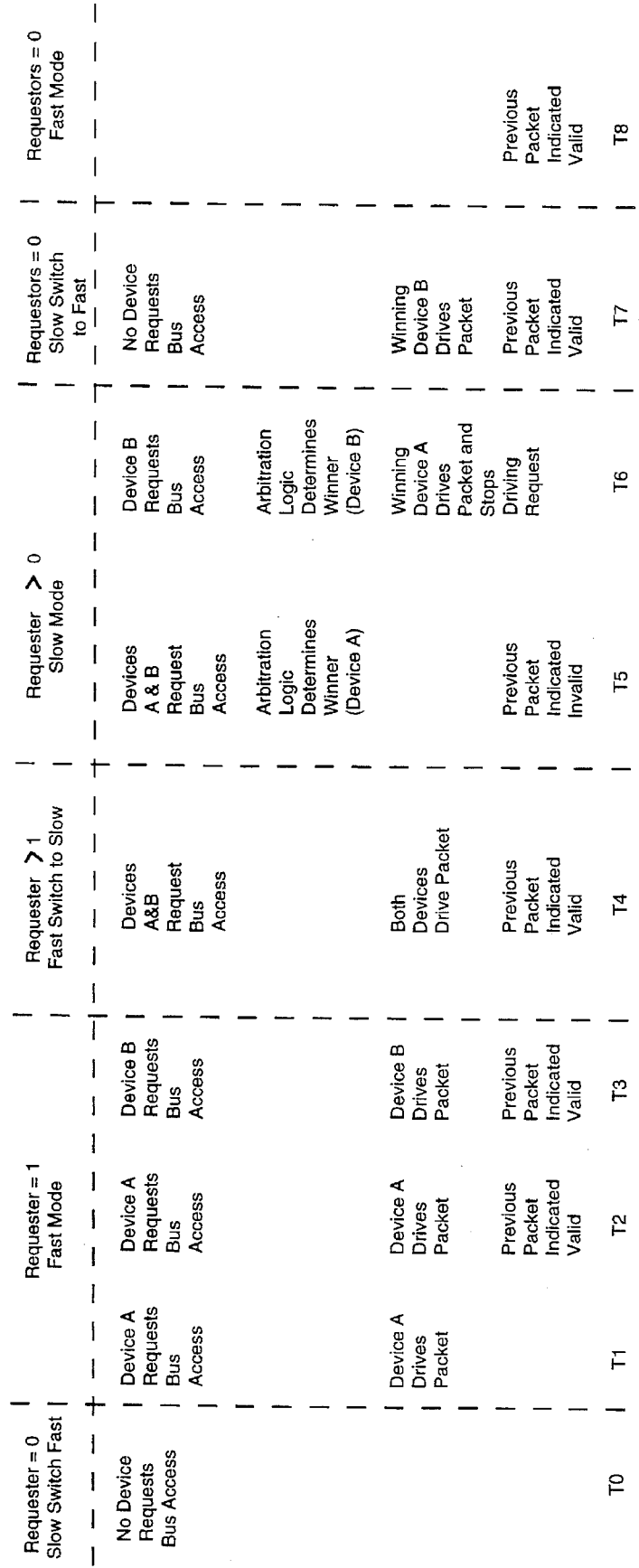
FIG. 5 is a timing table of an exemplary arbitration sequence employing the invention.

FIG. 5 is a timing table which reflects various actions taken in a system employing the instant invention. In this timing table, time T0 reflects that no requesters are currently reflected in the bus. Accordingly, the state machine will either stay in the fast state or switch to the fast state responsive to the lack of requesters. At time T1, a single device (Device A) requests access to the bus and drives a packet on the bus. In T2, device A 22 again requests the bus and drives another packet on the bus. The arbitration unit indicates that the previous packet is valid since only one dryer drove the bus. In T3, device B 23 requests access to the bus and drives the bus. The packet previously driven by device A is indicated valid. In T4, devices A 22 and B 23 request the shared bus 27, and both devices drive the shared bus 27. The previous packet driven by device B is indicated valid. Because there is more than one requester, the state machine 34 switches to the slow state corresponding to the second arbitration mode with up to two cycles of latency. In T5, the arbitration logic 33 determines the winner between devices A and B which were both previously requested in access to the shared bus 27, and the previous packet as indicated as invalid. In the following cycle T6, winning device A 22 drives the shared bus 27, and stops asserting the request while losing device B 23 maintains its request 29 and is determined to be the winner of the arbitration. In T7, winning device B 23 drives the shared bus 22, no devices request the bus. In T8, the packet driven in the previous cycle is indicated valid, and the state machine switches back to fast mode. It will be recognized by one of ordinary skill of the art that this represents a sampling of possible occurrences, and is merely illustrative of modes of operation that may occur. Moreover, this example is done with reference to only two devices. The invention is envisioned to be able to be used with any number of devices up to the maximum supported by the particular shared bus employed within the system.

In the foregoing specification, the invention has been described with reference to specific embodiments thereof. It will however be evident that various modifications and changes can be made thereto without departing from the broader spirit and scope of the invention as set forth in the appended claims. The specification and drawings are accordingly, to be regarded in an illustrative rather than a restrictive sense. Therefore, the scope of the invention should be limited only by the appended claims.

What is claimed is:

1. A method of reducing latency of bus arbitration comprising the steps of:

switching between a fast and a slow arbitration state responsive to a number of devices requesting access to a bus during a predetermined time period;

wherein fast arbitration includes: requesting access to the bus while simultaneously driving a packet on the bus, determining if multiple devices drove the bus during a time period, and invalidating any packets driven during the time period if multiple devices drove the bus during the time period.

2. The method of claim 1 further comprising the steps of:

entering the fast arbitration state when no requests are made within the predetermined time period;

remaining in the fast arbitration state as long as no more than one device requests access; and entering the slow arbitration state any time a second request is pending at the same time a first request is asserted.

3. The method of claim 1 wherein slow arbitration comprises the steps of:

requesting access to the bus;

waiting for a winner to be declared; and driving a packet on the bus after the winner has been declared.

4. The method of claim 1 wherein fast arbitration further comprises the step of:

declaring a winner between requesters requesting the bus during the time period;

allowing the winner to redrive the packet on the bus.

5. The method of claim 3 wherein the winner may simultaneously request and drive a packet on the bus in a next predetermined time period.

6. A computer system comprising:

a plurality of devices coupled to a shared bus;

a bus arbitration unit having a plurality of modes of operation wherein a first mode has simultaneous requesting of access to the bus and driving packets on the bus and invalidation of packets if more than one device drove the bus during a predetermined time period, and a second mode has a predetermined latency between request and bus access; and an arbitration bus coupling the devices to the arbitration unit.

7. The system of claim 6 wherein the arbitration unit further comprises:

a state machine which dictates a mode of operation based on device requests asserted on the arbitration bus, and arbitration logic which determines access in the event of a plurality of device requests during a predetermined time period.

8. The system of claim 7 wherein the state machine dictates a switch from second mode to first mode after no requests have been made for a predetermined period of time.

9. The system of claim 7 wherein the state machine dictates a switch from the first mode to the second mode any time a plurality of requests occur during a predetermined time period.

10. The system of claim 7 wherein requests on the arbitration bus remain asserted until an asserting device gains access to the shared bus.

11. The system of claim 9 further comprising a signal driver responsive to the switch from the first mode to the second mode which invalidates any packet driven on the shared bus during the predetermined time period before the switch.

12. An apparatus for switching between arbitration modes comprising:

arbitration logic coupled to an arbitration bus; and a state machine coupled to the arbitration bus having a plurality of states corresponding to arbitration modes wherein the arbitration modes include a first mode in which a request for bus access by a device is simultaneous with the device driving a packet on the bus and packets are invalidated if multiple devices drive the bus in a same time period; and a second mode having a predetermined maximum latency between the request and the access.

13. The system of claim 12 wherein the state machine dictates a switch from said second mode to said first mode after no requests have been made for a predetermined period of time.

14. The system of claim 12 wherein the state machine dictates a switch from the first mode to the second mode any time a plurality of requests occur during the predetermined period.

15. The system of claim 12 wherein requests on the arbitration bus remain asserted until an asserting device gains access to the system bus.

* * * * *